Feb. 22, 1927.
L. D. SOUBIER
GLASS FEEDER
Filed March 3, 1924
1,618,313
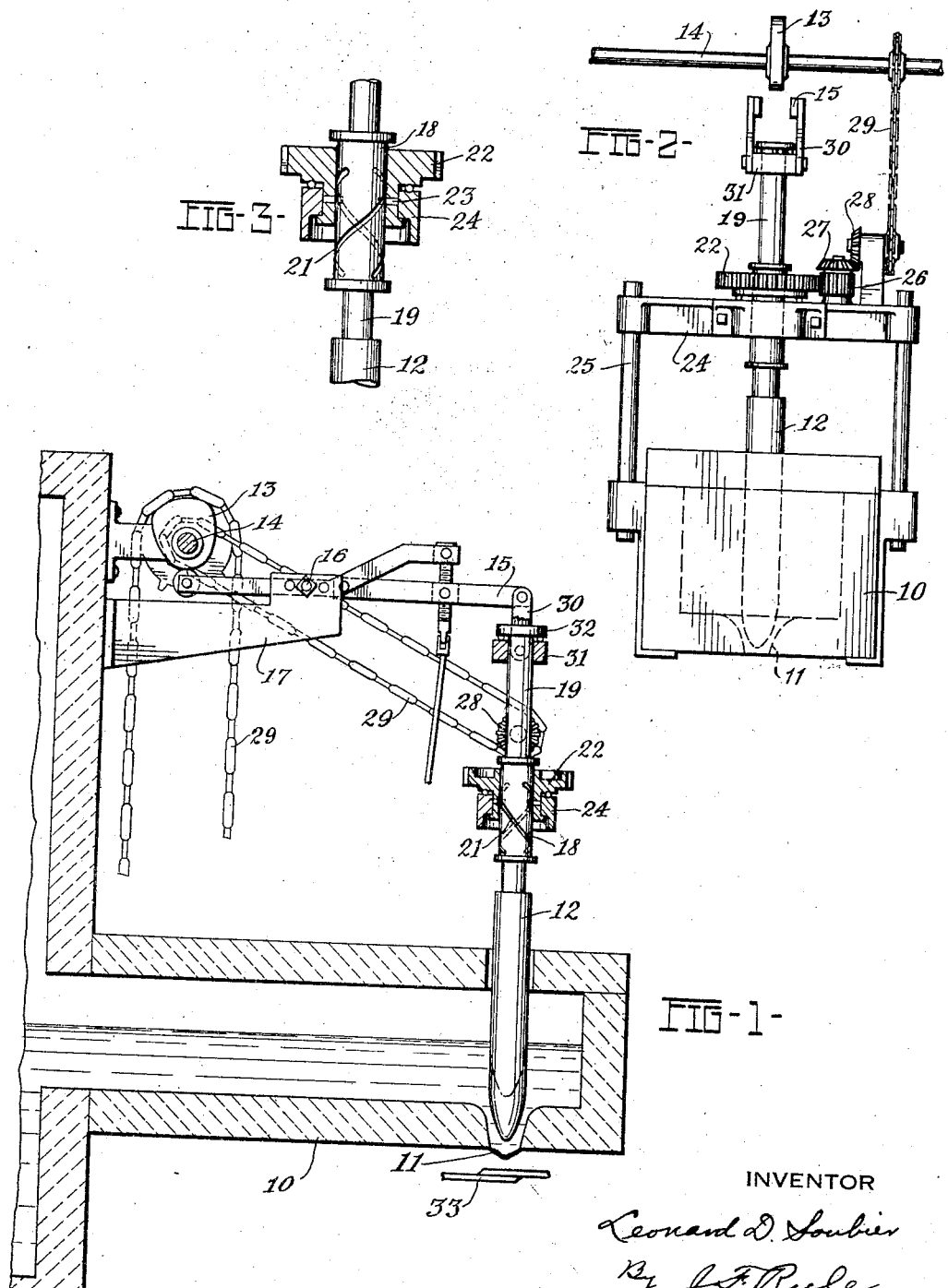
INVENTOR
Leonard D. Soubier
By J. F. Rule
His attorney Patented Feb. 22, 1927.

1,618,313

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

GLASS FEEDER.

Application filed March 3, 1924. Serial No. 696,500.

My invention relates to glass feeders of the type in which the molten glass is discharged through an outlet opening in the bottom of a container, the discharge being controlled by a regulating implement in the form of a plunger reciprocating in the glass over the outlet. In feeders of this type, the plunger is sometimes given a rotative movement about its own axis in addition to its reciprocating movements. This rotation of the plunger is for the purpose of producing homogeneity and uniform temperature of the glass and preventing chilling or stagnation of the glass in front of the plunger, to thereby prevent cold streaks or unevenness of temperature in the issuing glass.

An object of the present invention is to provide means for periodically varying the speed of rotation of the regulator in synchronism with its vertical movements. The speed of rotation of the regulator may be either accelerated or decreased at any desired period during its cycle of movements, depending upon the results desired. For example, the speed of rotation may be accelerated during the upward movement of the regulator, thereby increasing the effectiveness of the regulator in retracting the glass at the outlet or retarding the flow. Under some working conditions, it may be desirable to reduce the speed of rotation during the upward movement of the regulator and thereby reduce the effectiveness of the upward pull thereof on the glass. It is also sometimes desirable to reduce or stop the rotation of the regulator during its downward movement, thereby reducing or eliminating the tendency to impart a spiral movement to the issuing charge of glass. An object of the present invention is to provide means for effecting such and other variations in the rotative movements of the regulator as may be desired.

Other objects of the invention will appear hereinafter.

In the accompanying drawings:

Figure 1 is a sectional side elevation of a feeder constructed in accordance with my invention.

Figure 2 is a front elevation of the same.

Figure 3 is a sectional detail on a larger scale showing means for governing the speed of rotation of the regulator.

The feeder comprises a container 10 for molten glass, here shown as a furnace boot or extension, provided with an outlet opening 11 through which the glass issues. The flow of glass is regulated and controlled by a clay plunger or regulator 12 which is periodically reciprocated vertically. The plunger is reciprocated by any approved mechanism, as for example, a continuously rotating cam 13 on a drive shaft 14. The cam operates through a lever 15 fulcrumed at 16 on a bracket 17. A sleeve 18 mounted on the stem 19 of the plunger is provided with spiral grooves 21 in its outer surface. A gear 22 rotatively mounted on the sleeve 18 is provided with pins or lugs 23 which extend into the grooves 21. The hub of the gear 22 has a bearing in a yoke 24 mounted on standards 25 extending upward from the supporting frame of the boot. The gear 22 is driven from the shaft 14 through a train of gearing comprising a pinion 26, bevel gears 27, 28 and a sprocket chain 29. The connection between the lever 15 and the stem 19 comprises a pair of links 30 connecting said lever with a bearing ring 31 surrounding the stem 19. Bearing balls are interposed between the upper shouldered end 32 of the stem 19 and the ring 31.

The operation is as follows: The cam 13 driven by the continuously rotating drive shaft 14 operates through the lever 15 to periodically reciprocate the regulating plunger. As the plunger moves downward, it exerts an expelling force on the issuing glass and controls the shape of the glass in a well known manner. Shears 33 sever the suspended charge of glass when the plunger is in its lowered position. As the plug moves upward, it exerts an upward pull on the stub of glass remaining after the shears operate. The gear 22 is rotated continuously at a constant speed owing to its driving connection with the shaft 14. This rotation of the gear is imparted to the regulating plunger by means of the driving pins 23 so that the plunger rotates at the same angular speed as the gear 22 when the plunger is not moving up or down. As the plunger moves downward, the spiral cam grooves 21 impart a rotative movement to the plunger relative to the gear 22. This rotative movement of the plunger due to the cam grooves is either added to or subtracted from that of the gear 22, depending on the direction and pitch of the grooves, the speed of the gear and the speed with which the plunger moves vertically. For example, the spirals 21 may extend in a direction to rotate the plunger relatively to the gear as the plunger descends, in the direction opposite to the rotation of the gear. As a result, the rotative movement of the plunger is decreased or may be reduced to zero so that there is no rotation of the plunger as it moves downward. By sufficiently reducing the pitch of the spirals, the plunger may be made to rotate in the reverse direction from that of the gear. If the cam 13 is shaped to cause the plunger to move at different speeds during different periods of its downward movement, the speed of rotation will be correspondingly varied. Also, by making the pitch of the spirals greater at one point than another, the speed of rotation may likewise be varied.

Assuming the direction of the spirals 21 to be such that the speed of rotation of the plunger is reduced during its downward movement, there will evidently be a corresponding increase in the speed of rotation as the plunger moves upward. In this manner, the retractive action or upward pull of the plunger on the glass at the outlet is materially increased, giving a more effective control of the glass. Also, by reducing the rotative movement of the plunger as it descends, the tendency to impart a spiral or twisting movement to the issuing glass is reduced or overcome. By reversing the direction of rotation of the drive shaft 14, the speed of rotation of the plunger during its downward movement may be increased and the speed of rotation during the upward movement decreased, or vice versa.

Modifications may be resorted to within the spirit and scope of my invention.

What I claim is:

1. In an apparatus for delivering charges of molten glass, the combination of a container having an outlet through which the glass issues, a regulating device within the glass adjacent the outlet, means to periodically move said device toward and from the outlet for causing an expelling and retarding action on the glass, means to rotate said device, and means to periodically vary the speed of rotation of said device.

2. In an apparatus for delivering charges of molten glass, the combination of a container having an outlet through which the glass issues, a regulating device within the glass adjacent the outlet, means to periodically move said device toward and from the outlet for causing an expelling and retarding action on the glass, means to rotate said device, and means to automatically effect a variation in the speed of rotation proportional to the speed of movement of said device toward or from the outlet.

3. The combination of a container for molten glass having an outlet through which the glass issues, a regulating plunger, means to periodically move it toward and from the outlet, means for rotating the plunger, and means for periodically varying the speed of rotation in synchronism with movements of the plunger toward and from the outlet.

4. The combination of a container for molten glass having an outlet through which the glass issues, a regulating device, means to periodically move it toward and from the outlet, means for continuously rotating the implement, and automatic means to increase the speed of rotation as the implement moves in one direction and to decrease the speed when it moves in the opposite direction.

5. The combination of a container for molten glass having an outlet through which the glass issues, a regulating plunger, means to periodically move it toward and from the outlet, means for continuously rotating the plunger, and automatic means for increasing the speed of rotation during each movement of the plunger in one direction.

6. The combination of a container for molten glass having an outlet through which the glass issues, a regulating implement, means to periodically move it toward and from the outlet, means for continuously rotating the implement, and automatic means for increasing the speed of rotation during the movement of the implement away from the outlet.

7. The combination of a container for molten glass having an outlet through which the glass issues, a regulating implement, means to periodically move it toward and from the outlet, means for continuously rotating the implement, and automatic means for increasing the speed of rotation during the movement of the implement away from the outlet and for decreasing the speed of rotation while the implement is moving toward the outlet.

8. The combination of a container for molten glass having an outlet through which the glass issues, a regulating plunger, means to periodically move it toward and from the outlet, means for rotating the plunger comprising a continuously rotating gear, and operating connections between the plunger and gear for rotating the plunger at the same angular speed as the gear while the plunger is not reciprocating and for changing the speed of rotation of the plunger relatively to that of the gear while the plunger is moving toward or from the outlet.

9. The combination of a container for molten glass having an outlet through which the glass issues, a regulating plunger, means to periodically move it toward and from the outlet, a continuously rotating gear surrounding the plunger and having a connection with the plunger for rotating the latter, means to hold the gear against reciprocating movement with the plunger, and a spiral cam operative by the reciprocating movement of the plunger to vary the speed of rotation of the plunger relative to that of the gear.

10. In a glass feeder, the combination of a receptacle for molten glass having an outlet opening in the bottom thereof, a vertical plunger projecting into the glass over the outlet, means for periodically reciprocating the plunger vertically, a tubular member mounted on the stem of the plunger, a non-reciprocating gear surrounding said member, means for continuously driving said gear, and a spiral cam on said member operative by the reciprocation of the plunger to effect a relative rotation of the gear and plunger to thereby vary the speed of rotation of the plunger in synchronism with the reciprocating movements thereof.

Signed at Toledo, in the county of Lucas and State of Ohio, this 1st day of March, 1924.

LEONARD D SOUBIER.